(12) United States Patent
Kasturi et al.

(10) Patent No.: US 12,292,969 B2
(45) Date of Patent: May 6, 2025

(54) PROVENANCE INFERENCE FOR ADVANCED CMS-TARGETING ATTACKS

(71) Applicant: Georgia Tech Research Corporation, Atlanta, GA (US)

(72) Inventors: Ranjita Pai Kasturi, Atlanta, GA (US); Brendan D. Saltaformaggio, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 222 days.

(21) Appl. No.: 17/801,686

(22) PCT Filed: Mar. 4, 2021

(86) PCT No.: PCT/US2021/020894
§ 371 (c)(1),
(2) Date: Aug. 23, 2022

(87) PCT Pub. No.: WO2021/178678
PCT Pub. Date: Sep. 10, 2021

(65) Prior Publication Data
US 2023/0133791 A1    May 4, 2023

Related U.S. Application Data

(60) Provisional application No. 62/985,067, filed on Mar. 4, 2020.

(51) Int. Cl.
*G06F 21/55* (2013.01)
(52) U.S. Cl.
CPC ...... *G06F 21/554* (2013.01); *G06F 2221/033* (2013.01)

(58) Field of Classification Search
CPC .................. G06F 21/554; G06F 2221/033
See application file for complete search history.

(56) References Cited

U.S. PATENT DOCUMENTS

| | | | | |
|---|---|---|---|---|
| 9,477,836 B1* | 10/2016 | Ramam | ................. | H04W 12/02 |
| 10,460,107 B2* | 10/2019 | Crofton | ................. | G06F 21/566 |
| 11,755,420 B2* | 9/2023 | Borate | ................... | G06F 21/56 |
| | | | | 714/15 |

(Continued)

OTHER PUBLICATIONS

X. Zhao, J. Luan and M. Wolff, "Evaluating randomness in cyber attack textual artifacts," 2016 APWG Symposium on Electronic Crime Research (eCrime), Toronto, ON, Canada, 2016, pp. 1-5 (Year: 2016).*

*Primary Examiner* — Trong H Nguyen
*Assistant Examiner* — Samikshya Poudel
(74) *Attorney, Agent, or Firm* — Bryan W. Bockhop; Bockhop Intellectual Property Law, LLC (57) ABSTRACT

In a method for detecting an attack compromise window in a CMS website for which a temporal sequence of a plurality of snapshots of website backups have been stored, a temporally ordered set of spatial elements from each snapshot is constructed. Spatial metrics are computed for each individual snapshot's elements. The collected spatial metrics are temporally correlated and queried against attack models to recover an attack timeline. Attack events in the attack timeline are labelled. A sequence of assigned attack labels is verified. The compromise window is extracted from the plurality of snapshots.

16 Claims, 3 Drawing Sheets

(56) References Cited

U.S. PATENT DOCUMENTS

| | | | | |
|---|---|---|---|---|
| 2010/0024033 | A1* | 1/2010 | Kang | H04L 63/1466 |
| | | | | 726/23 |
| 2016/0308966 | A1* | 10/2016 | Zhang | G06Q 10/00 |
| 2018/0307839 | A1* | 10/2018 | Bhave | G06F 21/552 |
| 2020/0042707 | A1* | 2/2020 | Kucherov | G06F 3/0683 |
| 2020/0233962 | A1* | 7/2020 | Chantry | G06F 8/311 |
| 2021/0056203 | A1* | 2/2021 | Qiao | G06F 16/27 |
| 2021/0165879 | A1* | 6/2021 | Duo | H04L 63/1416 |
| 2021/0240828 | A1* | 8/2021 | Gaurav | G06F 21/565 |
| 2021/0247743 | A1* | 8/2021 | Raj | G05B 23/0291 |

\* cited by examiner

PROVENANCE INFERENCE FOR ADVANCED CMS-TARGETING ATTACKS

CROSS-REFERENCE TO RELATED APPLICATION(S)

This application claims the benefit of PCT Patent Application Serial No. PCT/US21/20894, filed Mar. 4, 2021, which claims the benefit of U.S. Provisional Patent Application Ser. No. 62/985,067, filed Mar. 4, 2020, the entirety of each of which is hereby incorporated herein by reference.

STATEMENT OF GOVERNMENT SUPPORT

This invention was made with government support under grant number 1755721, awarded by the National Science Foundation. The government has certain rights in the invention.

BACKGROUND OF THE INVENTION

1. Field of the Invention

The present invention relates to digital security systems and, more specifically, to a system for detecting attacks that target CMS systems.

2. Description of the Related Art

Over 55% of the world's websites run on content management systems (CMS), with WordPress controlling nearly 60% of the CMS market. Unfortunately, this widespread adoption has led to a swift increase in CMS-targeting cyber-attacks. These attacks are made even easier, because CMS deployments tend to be an amalgam of layered software and interpreters, all with varying degrees of network and system permission, which execute on the internet-facing web server. Also, common compromises of CMS deployments tend to exhibit what are referred to as "low and slow" characteristics indicative of multi-stage attacks.

Despite the significant deployment of these complex software systems few systems effectively remediate CMS-targeting cyber-attacks. Existing systems use fine-grained logging to try to understand the provenance of an attack. Unfortunately, in the CMS domain, these techniques tend not to be widely used in practice. This is because fine-grained logging solutions still incur notable performance/space overhead and often require instrumenting and training with the target systems. Moreover, website owners often have no control over the underlying web server because the entire platform is usually owned and maintained by a hosting provider.

For these reasons, the main approach for dealing with compromised CMS deployments employs a "backup and restore" model of security, which are offered by popular platforms (e.g., Dropmysite, Codeguard, GoDaddy, Sucuri, and iPage). These systems stores nightly backups of each website's files that are maintained offsite. They also employ anti-virus (AV) scanners to detect compromises in websites. When a compromised data is detected by an AV scanner in a website, these systems restore the last-know non-compromised copy of the website. (Backed up copies of websites are often referred to as "snapshots" of the website.)

Unfortunately, the signatures used by AV scanners catch only well-known malware and they frequently fail to detect stealthy multi-stage attacks. Also, high false alarm rates often result in real alerts being ignored. Moreover, website owners often erroneously revert to the most recent snapshot which did not trigger an AV alert, but the snapshot used to restore the website may actually include stealthy malware code that the AV scanner failed to detect. Also, it has been found that website owners rollback to an earlier snapshot for only about 31% of true alerts and only one-third of those rollback to an actually pre-initial-infection state.

Recently, Applicants have discovered that the evolution of a typical CMS attack tends to exhibit clear multi-stage attack patterns: (1) slowly establishing an initial foothold; (2) quietly maintaining persistence; (3) lateral movement; and (2) cleaning up traces of earlier phases. Because these patterns tend to evolve over time, it can be difficult to detect an attack by analyzing a single snapshot. Generally, it has been found that attacks persist in CMS websites for a minimum of 6 days and a maximum of 1694 days, with a median of 40 to 100 days. One study indicated that more than 20% of WordPress websites observed in one study housed attacks for over a year. These attacks typically involved stealthily dropping a huge volume of malicious code affecting the web server.

Therefore, there is a need for a system that detects a likelihood that that website has been attacked by analyzing states of the website over time.

SUMMARY OF THE INVENTION

The disadvantages of the prior art are overcome by the present invention which, in one aspect, is a method for detecting an attack compromise window in a CMS website for which a temporal sequence of a plurality of snapshots of website backups have been stored, in which a temporally ordered set of spatial elements from each snapshot is constructed. Spatial metrics are computed for each individual snapshot's elements. The collected spatial metrics are temporally correlated and queried against attack models to recover an attack timeline. Attack events in the attack timeline are labelled. A sequence of assigned attack labels is verified. The compromise window is extracted from the plurality of snapshots.

In another aspect, the invention is a method for detecting an attack compromise window in a CMS website for which a temporal sequence of a plurality of snapshots of website backups have been stored, in which the following steps are executed:
constructing a temporally ordered set of spatial elements from each snapshot by extracting files associated with each snapshot and mapping the files as spatial elements; computing spatial metrics for each individual snapshot's elements by executing the steps of: extracting a structural metric from each snapshot's elements; and extracting a code metric from each snapshot's elements; temporally correlating the collected spatial metrics and querying them against attack models to recover an attack timeline and labelling attack events in the attack timeline by executing the steps of: querying each two consecutive temporal snapshots in a window at a time against a plurality of attack models; and assigning an attack label and a corresponding severity to each temporal snapshot, thereby building an incremental the attack timeline; verifying a sequence of assigned attack labels; and extracting the compromise window from the plurality of snapshots.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In one embodiment, the system is an automated provenance inference technique, which enables the investigation and remediation of CMS-targeting attacks based on only the nightly backups already being collected by website hosting companies.

Figure 1A:
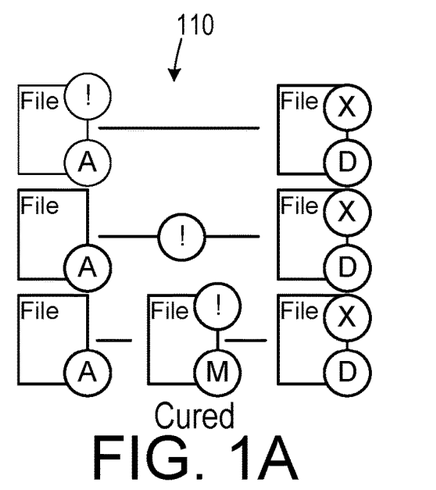
FIGS. 1A-1C are schematic diagrams showing three models of temporal infection evolution.
Figure 1B:
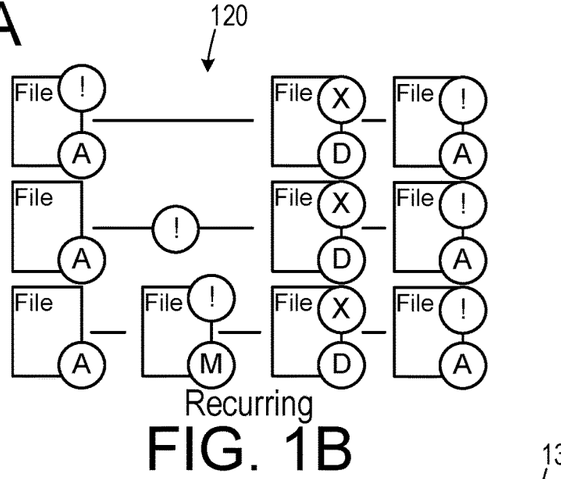
Figure 1C:
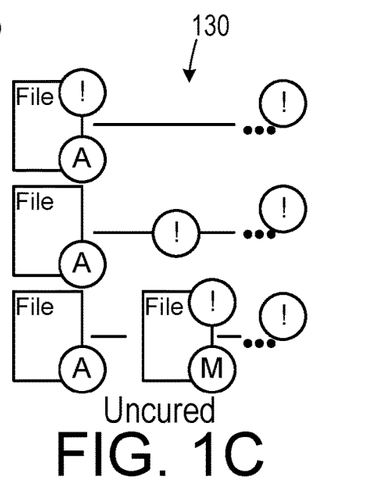

The system of the present invention reconstructs a timeline of the attack phases and recovers the compromise window, or the period of time during which the snapshots should not be trusted. In inferring provenance patterns, applicant has discovered that a finite number of identical provenance patterns exist within the evolution of all the websites. Generally, a file in a given snapshot can exist in 1 of 3 states: added, modified, or deleted. As shown in FIGS. 1A-1C, three infection scenarios can be observed in the website backups. A file added (denoted by Ⓐ) can be flagged as suspicious (denoted by ⊙) by an antivirus (AV) system at some point throughout its life cycle. These files could also be flagged as suspicious (by an AV) after they are modified (as denoted by Ⓜ). In some cases, a snapshot rollback is performed to treat the suspicious files by deleting (as denoted by ⊚) them. If the rollback deletes all of the attacker's files then the attack is cured 110, as shown in FIG. 1A. If the rollback adopts a snapshot that still includes the attacker's files, as shown in FIG. 1B, the attack regenerates the malicious files 120. In other cases, no action is taken despite detecting a suspicious file 130, as shown in FIG. 1C. This indicates that the industry standard of "backup and restore" is entirely insufficient. In fact, it has been found that about 80% of these websites remain infected—even though many website owners had rolled back to a snapshot and patched the vulnerability. This probably because most website owners lack forensic expertise and are unable to identify a pre-infection snapshot (leaving initial backdoors in place and allowing the attack to recur).

In order to quickly rollback to a clean snapshot, administrators must recover the compromised window or the period of time during which the snapshots should not be trusted. This is further complicated by the fact that each snapshot contains tens of thousands of files (an average of 11,292 files were counted in one study), adding to the complexity of the recovery. One experimental study drilled down into the individual snapshots from a single Drupal website (referred to herein as "W6828862" to ensure anonymity) over the course of 17 different snapshots (see Table I, below), which will serve as a running example throughout this disclosure.

Single Snapshot Metrics: The complexity of each snapshot can be reduced to a set of measurements, called spatial metrics, that highlight the existence of cyber attack evidence. In addition to the state of each file in the snapshot from before (the first spatial metric), another spatial metric measures extension mismatches among the files, i.e. if a file's internal format matches the filename's extension. Similarly, another spatial metric identifies UTF-8 based code obfuscation patterns in server-side script files. For example, in the case of W682886, 3 PHP files had obfuscated payloads disguised as icon files in the 5 June snapshot which initiated the attack. The system of the present invention employs 9 spatial metrics, which will be discussed in more detail below. These spatial metrics were found to be effective at highlighting the presence of cyber attack artifacts within a single snapshot.

Temporal Evolution Of Attack Phases: The experimental embodiment collected spatial metrics to represent each snapshot of W682886, paying specific attention to sudden changes between pairs of consecutive snapshots. This revealed that modelling the implicit events which trigger these sudden changes can expose the attack phases. Plot the temporal progression of the spatial metrics across a range of snapshots can show trends that lead to the detection of a cyber attack.

For example, Table I shows one such progression for website W682886 considering only a single spatial metric, i.e., the file format numbers. The temporal evolution of this metric exposes the first attack signs. As seen in Table I, sudden changes in the file format metric stand out on 21 April, 5-8 June, and 13-14 June (the dates on which the metrics were measured). Identical spatial metric outliers in 3 other Drupal websites from 14 April to 21 May suggest the attack's lateral movement. It has been found that web attacks tend to drop large volumes of files on a web server, which explains the sudden changes observed in file format metrics. These patterns also appear to evolve similarly over time-adding more functionality to the existing malicious code (e.g., one example started with only file read capabilities, and after 8 days evolved to modify files and communicate over an SSL gateway). Eventually, these attacks also tend to attempt cleaning up their footprints by deleting most of the attack files.

TABLE I

Temporal File Differential Analysis:

| Date | Outlier | PHP | HTML | ASCII | XML | PNG | ZIP |
|---|---|---|---|---|---|---|---|
| 20 Apr | — | 0 | 0 | +1 | 0 | 0 | 0 |
| 21 Apr | ⊙ | +7 | +1 | +3 | +21 | 0 | 0 |
| 22 Apr | — | −2 | 0 | +1 | 0 | 0 | 0 |
| 23 Apr | — | 0 | +2 | +2 | 0 | 0 | 0 |
| 24 Apr | — | 0 | 0 | +1 | 0 | 0 | 0 |
| 25 Apr | — | +3 | −1 | +6 | 0 | 0 | 0 |
| 05 Jun | ⊙ | −13 | +5 | +50 | 0 | +9 | +1 |
| 07 Jun | ⊙ | −31 | 0 | +1 | 0 | 0 | 0 |

TABLE I-continued

Temporal File Differential Analysis:

| Date | Outlier | PHP | HTML | ASCII | XML | PNG | ZIP |
|---|---|---|---|---|---|---|---|
| 08 Jun | ⊙ | −18 | −6 | −22 | −20 | −9 | −1 |
| 09 Jun | — | +5 | 0 | 0 | 0 | 0 | 0 |
| 10 Jun | — | 0 | 0 | +3 | 0 | 0 | 0 |
| 11 Jun | — | +5 | 0 | +1 | 0 | 0 | 0 |
| 12 Jun | — | +3 | −7 | −4 | 0 | 0 | 0 |
| 13 Jun | ⊙ | +9 | +13 | +28 | +20 | 0 | +1 |
| 14 Jun | ⊙ | −13 | −13 | −26 | −20 | 0 | −1 |
| 15 Jun | — | 0 | 0 | +1 | 0 | 0 | 0 |
| 16 Jun | — | 0 | 0 | +1 | 0 | 0 | 0 |

Attack Model: These patterns form the basis of the multi-stage attack model disclosed herein. Applicant's study found that these attacks consisted of slow and steady attack patterns starting with establishing an initial foothold, malware injection, maintaining persistence, lateral movement, and eventually cleaning up any traces of malicious activity.

Taken together, the above key observations drove the design of the system of the present invention. Modeling the temporal evolution of the spatial metrics allows the system of the present invention to infer the provenance of attack evidence. Further, identifying outliers within that evolution reveals both the compromise window (e.g., starting April 21 for W682886) and the progression of the attack phases. Using the system of the present invention, forensic investigators can know where to focus their efforts and website owners can quickly revert the website to a clean snapshot.

Figure 2:
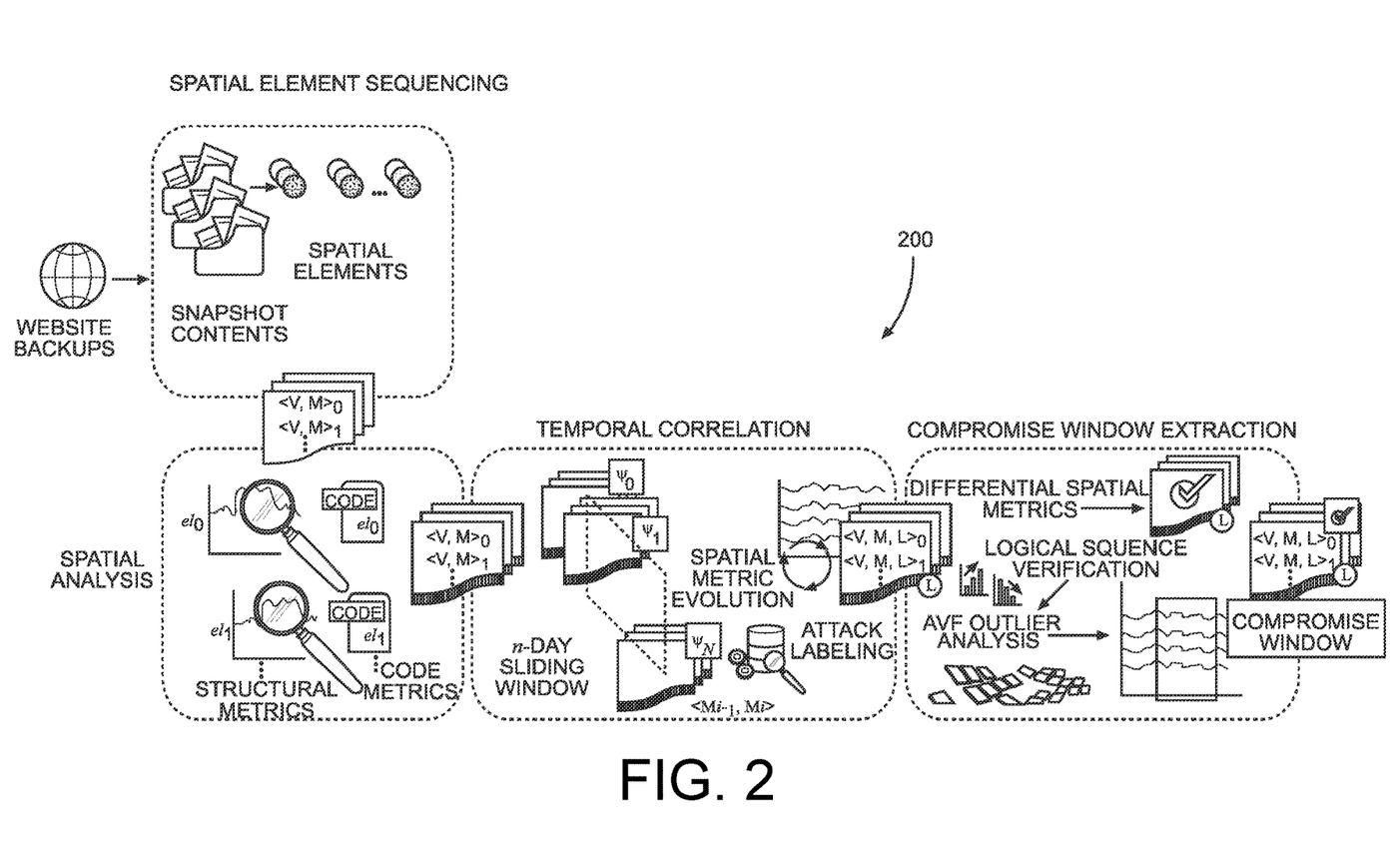
FIG. 2 is a schematic diagrams showing an overview of the steps employed in the system of the present invention.

The design the system of the present invention overcomes the challenges discussed above through provenance inference technique, using only the nightly backups of the CMS deployment. An overview of the phases of the system 200 of the present invention's operation are shown in FIG. 2, which includes four phases. Phase 1 constructs spatial element sets from the website backup. Phase 2 computes the structural and code metrics for each individual snapshot. Phase 3 temporally correlates the collected metrics and labels attack events. Phase 4 verifies the assigned attack labels and extracts the compromise window. First, the system of the present invention constructs a temporally ordered set of spatial elements from each snapshot of the website. It then computes spatial metrics for each individual snapshot's elements. This is followed by temporally correlating the collected spatial metrics and querying them against attack models to recover the timeline and label attack events. Finally, it verifies the sequence of assigned attack labels and extracts the compromise window.

Spatial Element Sequencing: The system of the present invention extracts the files associated with each night's snapshot and maps them as spatial elements $(el_j(\psi_i) \in V_i)$ for each snapshot $\psi_i \in \Psi$. Here, $\Psi$ is the set of all $\psi_i$, the label i denotes the index of the temporal snapshot under analysis, and j denotes the index of a spatial element in $V_i$. Essentially, $\psi i$ is a point in time when the $i^{th}$ snapshot was taken. $V_i$ is the set of spatial elements $(el_j)$ collected at time $\psi_i$. For example, the initial snapshot is collected at $\psi_0$, the next snapshot at $\psi_1$ and so on. At snapshot $\psi_0$, the set of elements are represented as $V_0 = [el_0, el_1, \ldots]$. These elements $(el_j(\psi_i)) \in V_i$ reside in the space $\Theta$ that denotes the monitoring space of all spatial elements (i.e., all versions of all files hosted on the web server).

While processing each temporal snapshot $\psi_i$, a set of initial spatial metrics $(m_k(\psi_i) \in M_i)$ are recorded in the set $M_i$. Here, the label k denotes the index of the spatial metrics collected at temporal snapshot $\psi_i$. These initial spatial metrics consists of the file type counts, and the state of each spatial element in terms of added, modified, or deleted. $M_i$ is further populated with carefully selected measurements. A comprehensive definition of the terminology used is presented in Table II below.

TABLE II

Formal Definitions of the State of the CMS Deployment:

| Name | Symbol | Definition | Description |
|---|---|---|---|
| Time | $\Psi = (\psi, \ldots)$ | $\Psi = (\mathbb{Z}, +)$ | Time measured in terms of the snapshot versions. |
| Space | $\Theta = (\theta, \ldots)$ | $\Theta = (\mathbb{Z}, +)$ | Space of elements that can be monitored. |
| Elements | $\mathbb{V} = (el, \ldots)$ | $el = el (\theta, \psi, \psi')$ | Files under investigation within their life span. |
| Spatial Metrics | $\mathbb{M} = (m, \ldots)$ | $m = m (\theta, \psi)$ | Measurements computed against a single night's snapshot of the website backup attributes. |
| Labels | $\mathbb{L} = (lb, \ldots)$ | $lb = lb (\psi, \theta)$ | An enumerable set of labels describing the events associated with the security of the elements. |

For example, the website W682886's initial snapshot $(\psi_0)$ contained 11, 327 files. All of these files are mapped as a sequence of spatial elements in $V_0$. As an example of a single spatial metric, this snapshot also contained 23 different file types (e.g., PHP, HTML, JS, CSS, etc.). This information was recorded within the spatial metric set $M_0$. If the backups are collected on a nightly basis for 3 months (e.g., 91 backups), then:

$V = [V_0, V_1, \ldots, V_{90}]$
$M = [M_0, M_1, \ldots, M_{90}]$
$V_0 = [el_0, el_1, \ldots, el_{11326}]$
$M_0 = [\text{num (PHP)} = 727, \text{num (CSS)} = 829, \ldots]$ Spatial Analysis: The set of spatial elements include various file types (such as PHP, HTML, JS, CSS, images, plaintext, etc.), each of which requires disparate investigation techniques to identify attack attributes. To address this challenge, the system splits spatial analysis to extract two types of metrics: (1) structural metrics and (2) code metrics.

Structural Metrics: With the computed set of spatial elements V and the initial metrics M for each temporal snapshot, the set V is investigated. The system employs a suite of lightweight measurements that highlight the existence of suspicious elements.

Hidden Files and Directories: Long-lived multi-stage attacks can be characterized by the attacker's intent to modify the existing setup and laying low at the same time. Applicant has observed that this was achieved by dropping malicious and/or suspicious elements as a hidden file or by placing them in a hidden directory to evade first order defenses. The system of the present invention employs pattern matching by filtering the typically expected hidden elements (such as .htaccess) and appends a structural metric Hide$(el_j(\psi_i))$ to $M_i$ upon finding an element $el_j \in V_i$ in a hidden location, because clean websites do not often employ hidden files or directories.

Extension Mismatch: Applicants have also observed that another common tactic used in CMS-targeting attacks was to disguise a server-side executable as something else. For example, spatial elements are frequently renamed deceptively as an icon file (e.g. favicon.ico) but contain PHP code to evade less technical CMS users. The system of the present invention uses the spatial element's filename to extract its extension and then matches it against the inferred file structural metric ExtMis($el_j(\psi_i)$) to $M_i$.

Filename Entropy: Another indicator of suspicious activity seen in CMS-targeting attacks is long, incoherent, or randomly generated filenames. The system of the present invention measures the entropy of filenames for all spatial elements $el_j$. A higher entropy indicates a more random filename that is less likely to be a human-generated benign filename. Entropy is measured using existing password strength calculation logic, which computes a filename's "randomness" score by measuring its similarity to several dictionaries, spatial keyboard patterns (e.g., QWERTY, Dvorak), repetition of a single character, sequences of numbers or characters, and other commonly used keywords (e.g., 133t). For the system of the present invention, the password strength output is analogous to higher entropy (more randomness) and thus a more suspicious filename.

Since may not be practical to identify an absolute threshold for high entropy in filenames, the system of the present invention compares the relative entropy of the spatial elements using the median absolute deviation (MAD) test. Specifically, instead of computing an absolute threshold for filename entropy, which is difficult to predict with certainty, the system of the present invention considers all of the elements in a given temporal snapshot to first find the median entropy of all elements, followed by computing the median absolute deviations for each element and eventually checking if the median absolute deviation is greater than a relative threshold. When a relatively higher entropy is identified for an element $el_j \in V_i$ from a temporal snapshot $\psi_i$, the structural metric HEntrp($el_j(\psi_i)$) is appended to $M_i$.

Permission Change: The system of the present invention uses temporal tracking of each spatial element to detect permission changes between snapshots. In particular, when the permissions of spatial elements change from non-executable (read-only, read-write, etc.) to executable, it raises suspicion since it is unusual for a developer to start with a non-executable and provide execute privileges to it. Multi-stage attacks package shell scripts in a text file and then change the permissions of the file to explore privilege escalation opportunities. Upon identifying an element $el_j \in V_i$ from a temporal snapshot $\psi_i$ with permission change equipping it with execute capabilities, the system of the present invention appends a structural metric Exec ($el_j(\psi_i)$) to $M_i$.

Code Metrics: Since the system is concerned with server-side attacks targeting CMSs, the system of the present invention analyzes the spatial elements containing code. These collected metrics are recorded for each snapshot $\psi_i$ and appended to the spatial metric set M.

Script Directive Outlier Analysis: Most of the server-side source code is either part of the CMS core, associated plugins, or website-owner developed code. As they are meant to be maintained by developers, it is unusual to find source code files among the spatial elements with script directives (parsable instruction sequences) that are thousands of characters long. Hence, injecting exceptionally long and complex lines of obscure code in the spatial elements is a strong indicator that can be leveraged to identify attack behaviors. Attackers use this tactic to limit the readability of injected code, delaying immediate reverse engineering attempts.

Figure 3:
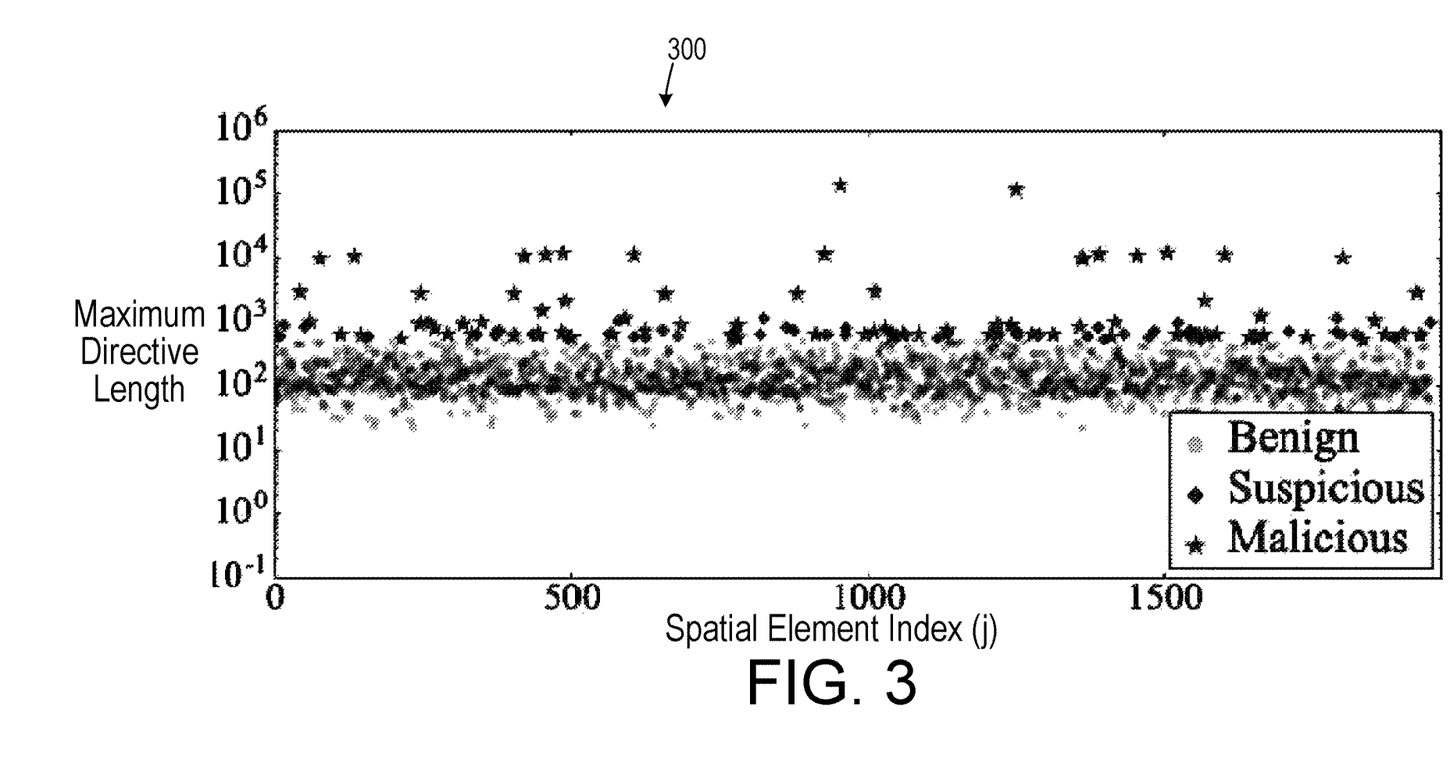
FIG. 3 is a chart showing Outlier detection within the directive length distribution of all code elements in one snapshot.

As shown in FIG. 3, the directive length distribution for all spatial elements containing server-side code for W682886's 2 May snapshot is plotted in a chart 300. The x-axis presents the spatial element index j, and the longest directive length for each of these code files is plotted along the y-axis. In benign elements (in which each data point is represented as a round dot) none of the directives were more than 500 characters long, whereas most attacker-injected elements (in which each data point is represented as a star) in this snapshot contained directives longer than 1500 characters. There was a mix of benign and malicious elements with maximum directive length between 500 and 1500 characters, which becomes the suspicious range (in which each data point is represented as a diamond).

Despite learning that long directives in spatial elements are suspicious, finding a threshold for directive length may not be practical due to varied coding styles and practices followed by different developers. However, it is possible to decide if a spatial element is suspicious by relatively comparing all the elements in any given temporal snapshot and performing outlier analysis. Thus, one can find suspicious files with relatively long directives using the median absolute deviation (MAD) previously described. Upon detection of the suspiciously long directive lines in a spatial element $el_j \in V_i$ from a temporal snapshot $\psi_i$, the system of the present invention appends the code metric LongLine($el_j(\psi_i)$) to the spatial metric set $M_i$.

Obfuscation Detection: server-side malware often uses a string that contains both UTF-8 characters (i.e., wide characters) and traditional 8-bit characters. While the construction of such a string itself is not malicious, it is a commonly used tactic to avoid detectors that look for known malicious string/code snippets. For example, a malicious PHP file disguised as an icon file can be included from the root of the CMS using the following long UTF-8 (shown in italic) coupled with ASCII (shown in bold) path to the file:

@include "\x2fmn\x74/s\x74or\x31-w\x632-\x64fw\x31/ 4\ x3505 \x327/\x77ww\x2ecv\x6dar\x61ci \x6eg. \x63om\ x2fwe \x62/c\x6fnt\x65nt\x2fmo\x64ul\x65s/ \x61gg\ x72eg\x61to\x72/t\x65st\x73/f\x61vi \x63on \x5fbd\ x33fd\x35.i\x630";

Array map obfuscation is another obfuscation scheme commonly used to evade defenses. An array map is defined to map each character to a different character. This map is used to deobfuscate what appears to be a jumbled list of characters to a reverse engineer trying to make sense of this obfuscated spatial element. For example, in the following code snippet, Inhqvwxeon( ) is a function that takes a jumbled character string (in the variable $zvkgw) and uses the array map in $lyfuf to generate malicious code that gets executed as part of the PHP eval function:

$lyfuf=Array ('1'=>'G', '0'=>'6', '3'=>'4', '2'=>'L', '5'=>'1', '4'=>'W', '7'=>'y', . . . , 'y'=>'w', 'x'=>'F', 'z'=>'1');

eval (Inhqvwxeon ($zvkgw, $lyfuf));

Upon spatial detection of obfuscation in an element $el_j \in V_i$ from a temporal snapshot $\psi_i$ via regex pattern matching for the cases described above, the system of the present invention appends a code metric Obfus($el_j(\psi_i)$) to $M_i$ indicating the presence of obfuscation in the element $el_j$.

Suspicious Payload Evaluation: In server-side spatial elements, functions such as eval, base64_decode, and url_decode are commonly paired to execute previously identified obfuscated code. The system of the present invention identifies and flags instances of the eval and base64_decode/url_decode pairing via pattern matching along each control flow. Upon identifying this code unwrapping technique in an element $el_j \in V_i$ from a temporal snapshot $\psi_i$, the system of the present invention appends a code metric EvDc($el_j(\psi_i)$) to $M_i$ indicating unsafe or suspicious code, compressed to avoid more conventional detectors.

Code Generation Capability: Almost every server-side spatial element contributing to the multi-stage CMS-targeting attack contains code generation capabilities such as the use of create_function. Although several developers use this as part of certain CMS plugins, it is very rarely employed in ordinary server-side code development. The system of the present invention scouts for such code generation capabilities and appends a code metric CodeGen($el_j(\psi_i)$) to the spatial metric set $M_i$ upon finding an element $el_j \in V_i$ satisfying the constraints.

Temporal Correlation and Forensic Recovery: Based on the collected spatial metrics for each snapshot, the system of the present invention now attempts to temporally correlate these metrics across snapshots to identify suspicious activities that evolve within the website. Here, the system of the present invention is programmed to track developments over a sliding n-day time window (e.g., n=20 means track developments in the spatial metrics by comparing them across 20 days). In this stage, the system of the present invention temporally correlates the spatial metric set M; at any temporal snapshot $\psi_i$ with the spatial metrics $M_x$ from all previous temporal snapshots within the sliding window $(i-n<x \leq i)$ to capture the persistent adversary relationship and extract the timeline of events.

Patterns in the metrics M, assigned as a function of spatial elements, indicate long-lived multi-stage attack behaviors which can be detected. The system constructs rules to encode these behaviors based on the Boolean composition of the spatial metrics. These rules are designed to be agnostic to the individual metrics and are based on the invariants of the phases that long-lived multi-stage attacks go through. Table III, below, shows the representative set of rules applied as part of the current implementation. Further, the temporal correlation of events encapsulating the patterns in spatial metrics is implemented by considering two consecutive temporal snapshots at a time. In particular, the 2-tuple $(M_i-1, M_i)$ is passed to the system of the present invention's temporal correlation phase (as shown in FIG. 2) where it is queried against the attack models from Table III. An attack label set $L_i$ and a severity are assigned to each temporal snapshot, thus incrementally building the attack timeline. The assigned severity of the attack labels tells the investigator which of the labels are more critical than the others.

script directive outlier is flagged in $el_j(\psi_i)$ but not $el_j(\psi_i-1)$ (i.e. obfuscated code is injected into an existing unobfuscated element), and the code metric Obfus ($el_j(\psi_i)) \in M_i$, then an attack label "Obfuscated Code Injection" is appended to the set $L_i$ at snapshot $\psi_i$. For the W682886 example, this label was assigned on 21 April, 7 June, and 13 June.

Note that multiple spatial elements $el_j(\psi_i) \in V_i$ can give rise to multiple labels for each temporal snapshot. For example, there can be three spatial elements associated with Obfus ($el_j(\psi_i)) \in M_i$ (i.e., 3 files with obfuscated code in them), and four other spatial elements associated with ExtMis ($el_j(\psi_i)) \in M_i$ (i.e., four shell scripts disguised as gifs). In this case, both event labels Obfuscated Code Injection and Privilege Escalation are appended to the set $L_i$, and the highest severity of the union of this set $L_i$ is assigned to the temporal snapshot $\psi_i$. It is also possible that multiple labels get assigned to a temporal snapshot due to one spatial element, i.e., an adversary can move a benign file to a hidden directory and inject it with suspicious obfuscated code. In this case, both Defense Evasion and Obfuscated Code Injection labels get appended to the set $L_i$ and follow the highest severity assignment as described above.

Compromise Window Recovery: With the attack labels in hand, the system of the present invention proceeds to extract the compromise window by parsing consecutive pairs of the 3-tuple of spatial elements, spatial metrics, and the assigned attack labels (i.e. $(V, M, L)_i$). Algorithm 1 below presents the pseudocode for this procedure. Lines 1-3 in Algorithm 1 describe how it takes the 3-tuple (V, M, L) as input, computes the differential spatial metrics DiffAttri for each snapshot at $\psi_i$ from consecutive pairs of $(V, M)_i-1$, $(V, M)_i$ (e.g., recall the differential file type information shown in Table I).

---

Algorithm 1: Compromise Window Detection

Input: $\mathbb{V} = [\mathbb{V}_0, \mathbb{V}_1, \ldots, \mathbb{V}_{N-1}]$, $\mathbb{M} = [\mathbb{M}_0, \mathbb{M}_1, \ldots, \mathbb{M}_{N-1}]$,
$\mathbb{L} = [\mathbb{L}_0, \mathbb{L}_1, \ldots, \mathbb{L}_{N-1}]$,
N = Number of temporal snapshots
Output: Suspicious Ranks = $[\psi_{\varkappa_0}, \psi_{\varkappa_1}, \ldots, \psi_{\varkappa_{N-1}}]$
CompromiseWindow = $[\Psi_{\varkappa_0}, \Psi_{\varkappa_1}, \ldots, \Psi_{\varkappa_k}]$
// Calculate frequency of each attribute value

---

TABLE III

Rules to Model Compromised CMS Events as Multi-Stage Attack Phases:

| Attack Label L | Severity | Attack Modeling Rule |
|---|---|---|
| Establish Foothold | Medium | ExtMis($el_j(\psi_i)) \vee [(el_j \notin \mathbb{V}) \wedge [$ HEntrp($el_j(\psi_i)) \vee$ Hide($el_j(\psi_i))]]$ |
| Obfuscated Code Injection | High | [(size($el_j(\psi_i))>$size($el_j(\psi_{i-1})))\vee($ MaxL($el_j(\psi_i))>$MaxL($el_j(\psi_{i-1})))]\wedge$Obfus($el_j(\psi_i))$ |
| Malware Dropped | High | $(el_j \notin \mathbb{V}_{i-1}) \wedge [$Obfuse($el_j(\psi_i)) \vee$ LongLine($el_j(\psi_i)) \vee$EvDc($el_j(\psi_i))]$ |
| Code Generation Capability | Low | CodeGen($el_j(\psi_i))$ |
| Defense Evasion | High | Hide($el_j(\psi_i)) \wedge [$Obfus($el_j(\psi_i)) \vee$HEntrp($el_j(\psi_i)) \vee$ExtMis($el_j(\psi_i))]]$ |
| Escalate Privileges | High | Exec($el_j(\psi_i)) \wedge \neg$Exec($el_j(\psi_{i-1}))$ |
| Maintain Presence | Medium | (Sev($el_j(\psi_i))==$High)$\wedge[($ Sev($el_j(\psi_{i-1}))==$High) |
| Attack Cleanup | Medium | (Sev($el_j(\psi_{i-1}))==$High)$\wedge[($ Sev($el_j(\psi_i))==$None)$\vee($Sev($el_j(\psi_i))==$Low)$\vee((el_j(\psi_i))\notin \mathbb{V}_i)]$ |

The rules presented in Table III capture the overall intuition behind our insights. For example, the running example W682886 has two cases of obfuscated code injection: (1) Suspicious obfuscated code injected into an existing unobfuscated element; and (2) Additional obfuscated code appended to an already obfuscated element. Based on this observation, if an obfuscated spatial element $el_j(\psi_i) \in V_i$ increases in size (i.e. obfuscated attack progression), or if a -continued Algorithm 1: Compromise Window Detection 1  for $\forall \psi_i \in \Psi$ do
2  | Diff Attr$_i \leftarrow \mathbb{V}_i - \mathbb{V}_{i-1}$, for each $el_j \in \mathbb{V}_i$
3  | Diff Attr$_i \leftarrow \mathbb{M}_i - \mathbb{M}_{i-1}$, for each $m_j \in \mathbb{M}_i$ -continued Algorithm 1: Compromise Window Detection

```
       | // Verify label sequence
 4     | if i! = 0 and L_i comes after L_{i-1} then
 5     |   | CorrectLabel_i = True
 6     | end
 7     end
 8     Attr Freq = Frequency of each attribute da_j ∈ Diff Attr
       // Calculate AVF scores
 9     for ∀Diff Attr_i ∈ Diff Attr do
10     |   score ← 0;
11     |   for da_j ∈ DiffAttr_i do
       |   | // Score for snapshot ψ_i
12     |   |   score ← score + AttrFreq[da_j]
13     |   end
14     |   AVFscores ← score/size(DiffAttr_i)
15     end
16     Suspicious Ranks ← return (sort ψ_i in order of minimum
            AVF scores)
17     for ∀ψ_i ∈ Ψ do
18     |   if CorrectLabel_i == True then
19     |   |   while AVFScores outside CompromiseWindow <
       |   |   AVFScores inside CompromiseWindow do
20     |   |   |   CompromiseWindow ← compute (range between
       |   |   |   first and last ψ_i with verified L_i )
21     |   |   end
22     |   end
23     end
24     return Suspicious Ranks, CompromiseWindow
```

As shown in Lines 8-16 in Algorithm 1, it then computes the attribute value frequencies (AVF) using the AVF algorithm (one representative example of which is shown below as Algorithm 2) on the differential spatial metrics DiffAttri and processes it to rank the temporal snapshots $\psi_i$ in order of suspicious activities. The AVF algorithm performs well on categorical data with multiple attributes, the differential spatial metrics in our case. In a typical AVF application, the number of anomalies to be detected are pre-programmed. Here, instead of choosing the number of anomalies to be detected, the system of the present invention uses the AVF algorithm to rank the temporal snapshots in the compromise window in the order of most suspicious to least suspicious.

Algorithm 2: Example of pseudocode for the AVF algorithm:

Label all data points as non-outliers
calculate frequency of each attribute value
foreach point x
AVFscore=Sum (frequency each attrib. value in x)/num.attribs
end foreach
return top k outliers with minimum AVFscore Before the system of the present invention outputs the final attack labels for the entire temporal sequence, it passes the label set L through logical sequence verification of the associated labels (Lines 4-6 in Algorithm 1) and assesses their order of appearance. For example, when the only labels assigned are 'code generation capability' and 'attack cleanup', it has been observed that these behaviors arise from benign elements populated by the web developer and mean no harm. In such cases, the labels are retained but their severities are reduced to 'None'. If the label 'maintain presence' is seen on a snapshot prior to any other event label such as 'establish foothold' or 'malware dropped' or any other high severity modeling rule, since we know that this event sequence is intuitively not feasible, the system of the present invention has been programmed (again via Boolean composition of the previous label rules) to filter out sequences that do not make logical sense.

The system of the present invention's compromise window is influenced only by the order of 2 out of the 8 labels, i.e., attack cleanup and maintain presence. The system of the present invention considers all combinations of the other labels as the beginning of a compromise window. This makes the system of the present invention robust against attackers who might try to deploy out-of-order payloads to confound the system of the present invention.

Once the logical sequence of the assigned labels is verified and the temporal snapshots are ranked in the order of suspicious activities, the system of the present invention then identifies the compromise window—the period between the first and the last temporal snapshot comprising of suspicious activities with assigned and verified labels L. Also, the window is chosen such that the AVF score for every temporal snapshot outside the compromise window is higher than the score for every temporal snapshot within the compromise window (see, lines 17-21 of Algorithm 1). This is the period when maximum suspicious activities take place in the website and help one to narrow down the analysis to a smaller window. These intuitive temporally correlated spatial metrics and the attack models both align well with the design and work well in practice.

For the example website under investigation ("W682886"), from 1 April-30 June, the compromise window was identified from 21 April-16 June. By applying the AVF algorithm, the system of the present invention output the following temporal snapshots for this website ranked in order of most suspicious to least suspicious as follows:

<-Most suspicious . . . Least suspicious-> 5 June, 13 June, 8 June, 14 June, 21 April, . . . , 29 June This aligns with the earlier visual inspection of the differential file type metrics presented in Table I.

Note than these attack models are scalable irrespective of the underlying CMS, i.e. when a new tactic is identified, the system of the present invention framework is designed to be highly modularized and can be easily updated to capture the essence of the new tactic and the attack label associated with it. Essentially, applying the attack modeling rules to spatial metrics and incrementally sliding along each temporal snapshot enables the system of the present invention to assign appropriate labels L along the compromise window, thus providing a timeline of the events as part of the long-lived multi-stage attack analysis.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112 (f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for remediating a content management systems website that has been subjected to a targeting attack and for which a temporal sequence of a plurality of snapshots of website backups have been stored, comprising the steps of:
  (a) detecting the targeting attack by:
    (i) constructing a temporally ordered set of spatial elements from each of the plurality of snapshots;
    (ii) computing spatial metrics for elements of each individual snapshot of the plurality of snapshots;
    (iii) temporally correlating the computed spatial metrics and querying them against attack models to recover an attack timeline and labelling attack events in the attack timeline with assigned attack labels;
    (iv) verifying a sequence of the assigned attack labels;
    (v) extracting an attack compromise window from the plurality of snapshots, the attack compromise window indicating a period between a first temporal snapshot that includes suspicious activities and a last temporal snapshot that includes suspicious activities; and
  (b) remediating the content management systems website by rolling back the content management systems website to one of the plurality of snapshots corresponding to a pre-compromise window snapshot, wherein the step of computing spatial metrics for each individual snapshot's elements comprises the steps of:
    extracting a structural metric from each snapshot's elements; and
    extracting a code metric from each snapshot's elements,
  wherein the step of extracting the attack compromise window from the plurality of snapshots comprises designating a subset of the plurality of snapshots as the attack compromise window when the structural metric and the code metric have an attack label of high severity according to a predetermined attack modeling rule, and
  wherein the step of extracting structural metrics comprises the steps of:
    detecting hidden files and hidden directories in each snapshot and, when detected then adding a hidden file element to the structural metric for the snapshot;
    detecting extension mismatches between file type and file extension in each snapshot and, when detected then adding an extension mismatch file element to the structural metric for the snapshot;
    detecting file name high entropy in each snapshot and, when detected then adding a file name high entropy element to the structural metric for the snapshot;
    and detecting permission changes between snapshots and, when detected then adding a permission name element to the structural metric for the snapshot,
  wherein the step of detecting the file name high entropy comprises the steps of:
    (a) computing a randomness score for each file name in the snapshot;
    (b) calculating a median absolute deviation of all randomness scores for the snapshot;
    (c) comparing the median absolute deviation to a relative threshold for the plurality of snapshots; and
    (d) when the median absolute deviation is greater than the relative threshold for the plurality of snapshots, then designating the snapshot as having high name entropy.

2. The method of claim 1, wherein the step of constructing the temporally ordered set of spatial elements from each snapshot comprises the step of extracting files associated with each snapshot and mapping the files as spatial elements.

3. The method of claim 1, wherein the step of detecting the file name high entropy comprises the step of detecting long, incoherent or randomly generated filenames.

4. The method of claim 1, wherein the step of detecting permission changes comprises the step of determining when a permission change has changed a file's permission from a non-executable state to an executable state.

5. The method of claim 1, wherein the step of extracting a code metric for each snapshot comprises the steps of:
  (a) detecting a script directive outlier in each snapshot and, when the script directive outlier is detected, then adding a script directive outlier element to the code metric for the snapshot; and
  (b) detecting an obfuscation indicator in each snapshot and, when the obfuscation indicator is detected, then adding an obfuscation indicator element to the code metric for the snapshot.

6. The method of claim 5, wherein the step of detecting a script directive outlier comprises the step of indicating that the script directive is an outlier if it has a predetermined number of characters that is greater than a threshold number of characters.

7. The method of claim 6, wherein the predetermined number is a number that is at least an average number of characters in all script directives in the snapshot.

8. The method of claim 5, wherein the obfuscation indicator comprises detection of UTF-8 characters coupled with ASCII characters in an executable file.

9. The method of claim 5, wherein the obfuscation indicator comprises a mapping function that maps at least a plurality of characters in the executable file to another corresponding plurality of characters.

10. The method of claim 1, wherein the step of temporally correlating the collected spatial metrics and querying them against attack models to recover an attack timeline and labelling attack events in the attack timeline comprises the steps of:
  (a) querying each two consecutive temporal snapshots in a window at a time against a plurality of attack models; and
  (b) assigning an attack label and a corresponding severity to each temporal snapshot, thereby building an incremental the attack timeline.

11. The method of claim 9, wherein the step of extracting the attack compromise window from the plurality of snapshots comprises the steps of:
  (a) parsing consecutive pairs of the spatial elements, the spatial metrics and the attack labels;
  (b) ranking the temporal snapshots in the attack compromise window in the order of most suspicious to least suspicious; and
  (c) outputting the final attack labels for the snapshots for the temporal sequence.

12. A method for remediating a content management systems website that has been subjected to a targeting attack and for which a temporal sequence of a plurality of snapshots of website backups have been stored, comprising the steps of:
(a) detecting the targeting attack by:
(i) constructing a temporally ordered set of spatial elements from each of the plurality of snapshots;
(ii) computing spatial metrics for elements of each individual snapshot of the plurality of snapshots by executing the steps of:
1. Extracting a structural metric from each snapshot's elements, wherein the step of extracting the structural metric comprises the steps of:
   (a) detecting hidden files and hidden directories in each snapshot and, when detected then adding a hidden file element to the structural metric for the snapshot;
   (b) detecting extension mismatches between file type and file extension in each snapshot and, when detected then adding an extension mismatch file element to the structural metric for the snapshot;
   (c) detecting file name high entropy in each snapshot and, when detected then adding a file name high entropy element to the structural metric for the snapshot;
   (d) detecting permission changes between snapshots and, when detected then adding a permission name element to the structural metric for the snapshot;
wherein the step of detecting the file name high entropy comprises the steps of:
   (a) computing a randomness score for each file name in the snapshot;
   (b) calculating a median absolute deviation of all randomness scores for the snapshot;
   (c) comparing the median absolute deviation to a relative threshold for the plurality of snapshots; and
   (d) when the median absolute deviation is greater than the relative threshold for the plurality of snapshots, then designating the snapshot as having high name entropy,
2. Extracting a code metric from each snapshot's elements;
(iii) temporally correlating the computed spatial metrics and querying them against attack models to recover an attack timeline and labelling attack events in the attack timeline with assigned attack labels by executing the steps of:
querying each two consecutive temporal snapshots in a window at a time against the plurality of attack models; and
assigning an attack label to each attack event and a corresponding severity to each temporal snapshot, thereby building an incremental attack timeline;
(iv) verifying a sequence of the assigned attack labels;
(v) extracting the attack compromise window from the plurality of snapshots, the attack compromise window indicating a period between a first temporal snapshot that includes suspicious activities and a last temporal snapshot that includes suspicious activities, wherein the step of extracting the attack compromise window from the plurality of snapshots comprises designating a subset of the plurality of snapshots as the attack compromise window when the structural metric and the code metric have an attack label of high severity according to a predetermined attack modeling rule; and
(b) remediating the content management systems website by rolling back the content management systems website to one of the plurality of snapshots corresponding to a pre-compromise window snapshot.

13. The method of claim 12 wherein the step of detecting the file name high entropy comprises the step of detecting long, incoherent or randomly generated filenames.

14. The method of claim 12, wherein the step of detecting permission changes comprises the step of determining when a permission change has changed a file's permission from a non-executable state to an executable state.

15. The method of claim 12, wherein the step of extracting a code metric for each snapshot comprises the steps of:
(a) detecting a script directive outlier in each snapshot by indicating that a script directive is an outlier if it has a predetermined number of characters that is greater than a threshold number of characters, wherein the predetermined number is a number that is at least an average number of characters in all script directives in the snapshot and, when the script directive outlier is detected, then adding a script directive outlier element to the code metric for the snapshot; and
(b) detecting an obfuscation indicator in each snapshot and, when the obfuscation indicator is detected, then adding an obfuscation indicator element to the code metric for the snapshot, wherein the obfuscation indicator includes at least one of:
   (i) a detection of UTF-8 characters coupled with ASCII characters in the executable file; and
   (ii) a mapping function that maps at least a plurality of characters in an executable file to another corresponding plurality of characters.

16. The method of claim 12, wherein the step of extracting the attack compromise window from the plurality of snapshots comprises the steps of:
(a) parsing consecutive pairs of the spatial elements, the spatial metrics and the attack labels;
(b) ranking the temporal snapshots in the attack compromise window in the order of most suspicious to least suspicious; and
(c) outputting the final attack labels for the snapshots for the temporal sequence.

* * * * *